United States Patent

Condon et al.

[15] 3,646,402
[45] Feb. 29, 1972

[54] SWITCHING OF INDUCTANCES

[72] Inventors: Joseph Henry Condon, Summit; David William Hagelbarger, Morris Township, Morris County, both of N.J.

[73] Assignee: Bell Telephone Laboratories, Incorporated, Murray Hill, Berkeley Heights, N.J.

[22] Filed: Aug. 20, 1970

[21] Appl. No.: 65,616

[52] U.S. Cl. ..............................317/137, 307/104, 307/127, 317/151, 317/157, 317/DIG. 4, 317/DIG. 6, 323/76, 335/268
[51] Int. Cl. .........................................................H01f 27/42
[58] Field of Search ..............317/151, 137, DIG. 6, 148.5 R, 317/148.5 B, 155.5, 157, 150, DIG. 4; 320/25, 26; 307/236, 127, 38, 41, 270; 335/268; 323/8, 76; 321/15

[56] References Cited

UNITED STATES PATENTS

| 3,188,526 | 6/1965 | Engel | 317/137 |
| 3,191,074 | 6/1965 | Carruthers et al. | 323/76 X |
| 3,170,140 | 2/1965 | Brucker-Steinkuhl | 317/137 X |
| 3,377,541 | 4/1968 | Farkas | 321/15 |

*Primary Examiner*—D. F. Duggan
*Assistant Examiner*—Harry E. Moose, Jr.
*Attorney*—R. J. Guenther and Edwin B. Cave

[57] ABSTRACT

Electric current can be rapidly switched from one inductance to another similar inductance if a capacitor is connected in parallel with the two inductances and diodes are suitably placed. The required power supply need only be large enough to maintain the steady state current flow. Switching takes place when the voltage applied to the circuit is reversed. An exemplary current reversing scheme uses a combination of a high voltage silicon controlled rectifier and a lower voltage switching transistor.

12 Claims, 5 Drawing Figures

PATENTED FEB 29 1972 3,646,402

INVENTORS J. H. CONDON
D. W. HAGELBARGER

BY *George S. Indig*

ATTORNEY

SWITCHING OF INDUCTANCES

BACKGROUND OF THE INVENTION

1. Field of the Invention

Large currents are switched rapidly between similar inductances.

2. Description of the Prior Art

It is well known that voltage transients are generated in inductive circuits when DC currents in these circuits are changed. This becomes a particular problem when large currents are switched in and out of large inductors. In order to accomplish such switching it is ordinarily required that power supplies be used which are large enough to provide these voltage transients. Switches used to accomplish these changes must also be engineered to withstand these high voltages. If mechanical switches are used, arc suppressors are usually included. If solid state switching is used, the switching transistors must be of a high voltage type.

SUMMARY OF THE INVENTION

A circuit has been developed which allows large DC currents to be switched between large inductances without requiring the use of large power supplies. A capacitor is included to store part of the energy of the large switching transients produced by the collapsing magnetic field of the inductance being switched off. This same transient voltage initiates current flow in the second inductance. Suitably placed rectifier diodes control the current flow and prevent the process from reversing. Once switching is complete, the power supply takes over and maintains the DC current flow. Switching takes place when the voltage applied to the circuit is reversed.

Most efficient operation of this network requires that the power supply appear as an open circuit when a large voltage is applied to its terminals during the switching transient. One simple way of accomplishing this is the inclusion of a suitable rectifier diode in series with the power supply. One particular use for which this circuit is well adapted is in the flux pump circuitry of a large superconducting magnet in which it is necessary to rapidly switch currents between the cryotron control-magnet windings. Other applications such as switching the control windings of saturable reactors and relays and the windings of stepping motors would be obvious to those skilled in the art.

DETAILED DESCRIPTION OF THE INVENTION

The rapid changing of a current through an inductance produces a large transient voltage. However, the maintenance of the current requires only small power supply voltages. In the disclosed circuit the decay of current from one inductance produces the large voltage required to start the current through another inductance. A capacitor is connected in parallel with the two inductances being switched in order to limit the rate of change of the transient voltage and the peak transient voltage. The value of the capacitance needed is dependent upon the amount of current being switched, the inductance of the inductances being switched, the allowable rate of change of voltage and the allowable peak voltage according to well-known principles. In this circuit the one-half $LI^2$ energy in one inductance is transferred to another approximately equal inductance by means of intermediate partial energy storage in the capacitor. Here "I" is the current flowing in the inductance being switched off and "L" is the value of the inductance being switched off. The inductance itself may include only one inductor or a number of inductors in series and/or parallel combination. The other inductance, the one being energized, need not be physically similar to the inductance being switched off. The only requirement, for most efficient operation, is that the value of the inductance, L, of the two inductances be similar. They may be different at the expense of operational efficiency.

Figure 1:
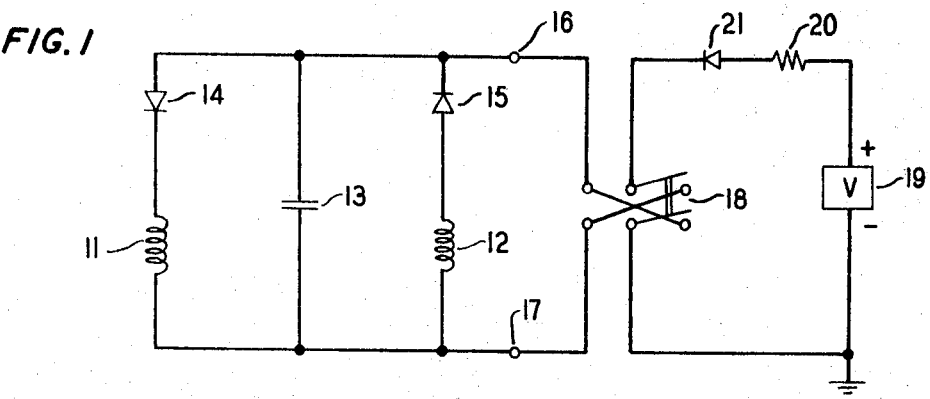
FIG. 1 is a schematic representation of an exemplary switching circuit in which switching is caused to take place by means of a single power supply and a reversing switch.

The operation of the circuit can be understood by reference to FIG. 1. With the reversing switch 18 thrown to the right a DC current flows through inductor 12 and diode 15. Current flow through inductor 11 is blocked by diode 14. When reversing switch 18 is thrown to the left, current through inductor 12 starts to decrease since it is not now being maintained by the power supply 19. This generates a large transient voltage which is blocked by diode 21, charges capacitor 13 and initiates current flow in inductor 11. When the transient voltage reaches its peak value, approximately one-half of the initial energy is stored in capacitor 13. As the current in inductor 12 continues to decrease and the transient voltage is reduced below its maximum value, capacitor 13 starts to discharge through inductor 11. When the switching is complete all of the current initially flowing through inductor 12 is now flowing through inductor 11 in the direction defined by diode 14 and power supply 19 takes over maintenance of the DC current flow through diode 21 and the current control resistor 20. Thus, current flow has been initiated in inductor 11 at a rate proportional to the large transient voltage rather than the small power supply voltage, producing rapid switching with very little demand on the power supply 19. Indeed, during switching, most efficient operation requires that the power supply 19 be effectively open circuited by the reverse biasing of diode 21. If low loss circuit elements are used, the switching process is very efficient. In superconducting circuits energy efficiencies as great as 99 percent have been achieved.

Figure 2:
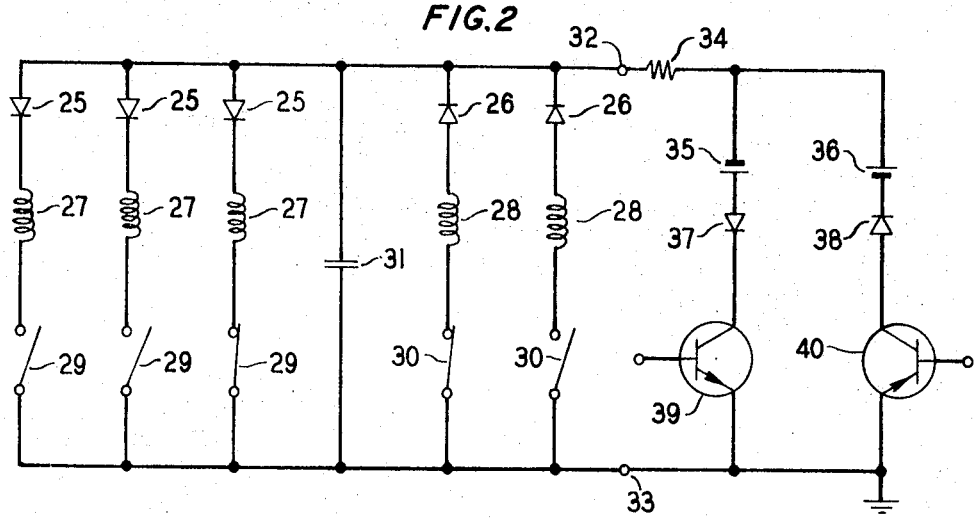
FIG. 2 is an exemplary circuit in which the inductors being switched are each members of a set of inductors and switching is accomplished by means of two power supplies and solid state switches.

FIG. 2 illustrates the fact that the inductances 27, 28 being switched may each be one or more members of a set of inductors, the particular inductors switched being selected by auxiliary selection switches 29, 30. The inductances being switched may be motor field windings such as in a stepping motor, solenoids, such as in mechanical switches, the control magnets of cryotron switches or saturable reactors or any other inductive elements required by those skilled in the art to be activated on command. One of the inductors being switched may even be a dummy used to store the magnetic energy until required elsewhere. The selection function 29, 30 can be combined with the diode function 25, 26 in a silicon controlled rectifier or similar controlled rectifier device.

Figure 3:
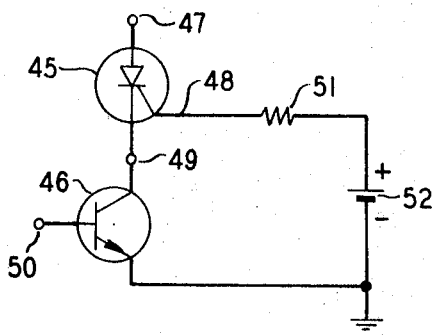
FIG. 3 is a schematic diagram of a solid state switch employing a silicon controlled rectifier in series with a switching transistor.
Figure 4:
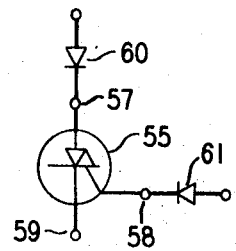
FIG. 4 is a schematic diagram of a portion of the solid state switch shown in FIG. 3 showing the additional diodes required if bidirectional control rectifiers are employed.
Figure 5:
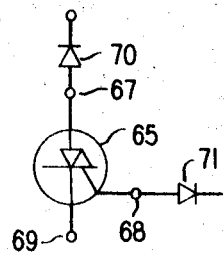
FIG. 5 is a schematic diagram of the device complementary to that shown in FIG. 4.

In FIG. 2 switching is accomplished using two power supplies 35, 36 of opposite polarity and switching transistors 39, 40. The diodes 37, 38 which cause the power supplies to appear as open circuits during the switching transients are appropriately inserted with opposite polarity. In this circuit, the transistor that is switched off must be capable of withstanding a reverse voltage equal to the peak transient voltage plus the power supply voltage. A circuit which may be used to reduce the requirements imposed upon the switching transistor is shown in FIG. 3. Here a control rectifier device 45 such as a silicon controlled rectifier is used in place of diode 37. When the transistor 46 is switched off by the suitable biasing of base lead 50, the emitter lead 49 never rises more than a few tenths of a volt above the control voltage applied to gate lead 48. Any large voltages applied to terminal 47 of the control rectifier are dropped across high voltage rated junctions within the controlled rectifier 45. When the switching transistor 46 is biased on, it is in a low resistance state and is not susceptible to damage. The circuit shown in FIG. 3 is useful when it is more economical to use a low voltage switching transistor 46 in combination with a high voltage silicon controlled rectifier 45 rather than a high voltage switching transistor 39. If a bidirectional silicon control rectifier is used, FIGS. 4 and 5 illustrate the required placement of supplementary diodes 60, 61, 70 and 71. These diodes are in the same polarity either both toward 60, 61 or both away from 70, 71, the bidirectional controlled rectifier.

We claim:

1. A circuit including means for switching electric current from a first portion to a parallel connected second portion characterized in that the said first portion is similar in inductance to the said second portion and in that the said first portion comprises a series connected first unidirectional device and the said second portion comprises a series connected second unidirectional device opposite in polarity to the said first unidirectional device and in that the said circuit comprises a capacitor connected in parallel with the said first and second portions with the result that the said switching is rapidly accomplished when the polarity of the voltage applied to the said first and second portion by the said means is reversed.

2. A circuit of claim 1 in which the said first portion comprises at least one branch.

3. A circuit of claim 2 in which each said branch comprises at least one inductor device.

4. A circuit of claim 3 in which each branch comprises selection means for selecting the said at least one branch to be included in the said first portion.

5. A circuit of claim 4 in which the said first unidirectional device together with the said selection means comprise a controlled rectifier device.

6. A circuit of claim 1 in which the said first portion comprises the energizing coil of an electromagnet.

7. A circuit of claim 6 in which the said energizing coil is composed essentially of a material selected for its superconducting properties.

8. A circuit of claim 1 in which the said first portion comprises at least one winding of a stepping motor.

9. A circuit of claim 1 in which the said first portion comprises the control winding of a saturable reactor device.

10. A circuit of claim 1 in which the said means comprises a third unidirectional device.

11. A circuit of claim 10 in which the said means comprises a switching transistor in the common emitter configuration, the collector lead of which said transistor is electrically connected to the cathode lead of a controlled rectifier device.

12. A circuit of claim 11 in which the said controlled rectifier device is a bidirectional controlled rectifier device and in which the said means includes the said third unidirectional device connected to the anode lead of the said controlled rectifier device and a fourth unidirectional device connected to the gate lead of the said controlled rectifier device in the same polarity as the said third unidirectional device.

* * * * *